(12) United States Patent
Anres

(10) Patent No.: US 12,091,951 B2
(45) Date of Patent: Sep. 17, 2024

(54) SUBSEA INSTALLATION FOR HEATING A TWO-PHASE LIQUID/GAS EFFLUENT CIRCULATING INSIDE A SUBSEA CASING

(71) Applicant: SAIPEM S.A., Montigny le Bretonneux (FR)

(72) Inventor: Stéphane Anres, Saint Cyr l'Ecole (FR)

(73) Assignee: SAIPEM S.A., Montigny le Bretonneux (FR)

( * ) Notice: Subject to any disclaimer, the term of this patent is extended or adjusted under 35 U.S.C. 154(b) by 400 days.

(21) Appl. No.: 17/109,777

(22) Filed: Dec. 2, 2020

(65) Prior Publication Data

US 2021/0180436 A1 Jun. 17, 2021

(30) Foreign Application Priority Data

Dec. 13, 2019 (FR) ...................... 1914434

(51) Int. Cl.
*E21B 43/24* (2006.01)
*E21B 43/01* (2006.01)
*H05B 6/10* (2006.01)
*H05B 6/44* (2006.01)

(52) U.S. Cl.
CPC .......... *E21B 43/2401* (2013.01); *E21B 43/01* (2013.01); *H05B 6/108* (2013.01); *H05B 6/44* (2013.01); *H05B 2206/022* (2013.01); *H05B 2214/03* (2013.01)

(58) Field of Classification Search
CPC .......... H05B 2206/022; H05B 2214/03; H05B 6/108; H05B 6/44; E21B 43/2401; E21B 43/01
See application file for complete search history.

(56) References Cited

U.S. PATENT DOCUMENTS

| 5,203,682 | A | * | 4/1993 | Inklebarger | ............. | E21B 43/20 |
| | | | | | | 417/252 |
| 8,025,100 | B2 | * | 9/2011 | Dehaene | ................... | F04F 5/54 |
| | | | | | | 96/194 |
| 10,816,123 | B2 | * | 10/2020 | Settouti | .................... | H05B 6/44 |

(Continued)

FOREIGN PATENT DOCUMENTS

| CN | 209131448 U | | 7/2019 |
| EP | 3040507 A1 | * | 7/2016 |

(Continued)

OTHER PUBLICATIONS

Machine translation of WO-2019039960: Fazlyev, Electric steam generator, 2019 (Year: 2019).*

(Continued)

*Primary Examiner* — Janie M Loeppke
*Assistant Examiner* — Abigail H Rhue
(74) *Attorney, Agent, or Firm* — Workman Nydegger

(57) ABSTRACT

A subsea installation for heating a two-phase liquid/gas effluent circulating within a subsea casing, includes a plurality of heated pipe sections which are successively connected to one another by curved pipe sections to form a heating coil, each heated pipe section being inclined with respect to the horizontal at an angle comprised between 2 and 10° in order to promote a distributed flow regime of the two-phase effluent and being provided with an induction heating system.

11 Claims, 3 Drawing Sheets

(56) References Cited

U.S. PATENT DOCUMENTS

2008/0262808 A1*  10/2008  Guet ..................... G05B 17/02
                                                    703/2
2017/0336011 A1    11/2017  Settouti et al.
2018/0106131 A1*   4/2018  Kanstad ................. E21B 43/01

FOREIGN PATENT DOCUMENTS

| JP | 2004019516 A    * | 1/2004 | |
|----|-------------------|--------|---|
| JP | 2011122804 A    * | 6/2011 | |
| WO | 2016066968 A1     | 5/2016 | |
| WO | WO-2019039960 A1 * | 2/2019 | .............. F22B 1/281 |

OTHER PUBLICATIONS

Machine translation of JP-2011122804: Fujita, Steam generating device, 2011 (Year: 2011).*
Machine translation of JP-2004019516: Asahi, Return fuel cooler for diesel engine, 2004 (Year: 2004).*
Search Report from corresponding French Application No. FR1914434, Jun. 15, 2020.
Office Action from corresponding European Application No. 20213367.4, Feb. 8, 2021.

* cited by examiner

SUBSEA INSTALLATION FOR HEATING A TWO-PHASE LIQUID/GAS EFFLUENT CIRCULATING INSIDE A SUBSEA CASING

BACKGROUND

Technical Field

The present invention relates to the general field of heating of metallic pipes for fluid transport, and in particular subsea pipes lying on the seabed and providing a link between subsea hydrocarbon production wells, in particular oil and gas, and a surface installation, for example a floating production, storage and unloading unit.

Prior Art

In a single offshore hydrocarbon production field, it is common to operate several wells that may be several kilometers or even tens of kilometers apart. The two-phase effluents (liquid/gas mixture) from these various wells must be collected by subsea pipes laid on the seabed and transferred via bottom-to-surface connecting pipes to a surface installation, such as a ship or a land-based collection point, which will collect them for storage (and possibly treatment).

Furthermore, because they are extracted at great depth underground, two-phase effluents from subsea hydrocarbon production wells exit at a relatively high temperature at seafloor level (typically of the order of 70° C.). Since seawater is generally cold, especially at great depths where it is typically 4° C., if no provision is made to conserve the heat in the effluent leaving the production wells, it will gradually cool as it travels through kilometers of subsea pipes. However, these two-phase effluents contain various chemical compounds for which cooling causes problems in maintaining good circulation conditions.

For example, gas molecules, notably methane, combine with water molecules to form, at low temperatures, hydrate crystals. The latter can stick to the walls, build up and form plugs that can block the subsea pipe. Similarly, the solubility in oil of high molecular weight compounds such as paraffins or asphaltenes decreases as the temperature drops, resulting in solid deposits that can also block the subsea pipe.

A known solution to avoid the formation of plugs in subsea pipes is to heat the subsea pipes along their entire length by means of one or more electric cables that are wound around the pipelines to heat them by the Joule effect. This solution, known as trace heating, keeps the two-phase effluent transported in the subsea pipes at a temperature above a critical threshold throughout its journey from the production well to the surface installation.

This solution presents obvious problems related to the installation of such electrical heating cables along the entire length of subsea pipes, with the significant costs that this represents in terms of installation and maintenance. In addition, the traced heating is based on the continuity of the installation along the entire length of the subsea pipes. However, if this continuity were to be broken for any reason at any point along the pipes, the entire installation would be out of service. This constraint means that this type of heating should only be considered for the so-called preservation phases of the transported effluent, and not for the operational phases of operation.

Publication WO 2016/066968 discloses a local heating station that can be placed at several locations along subsea pipes to ensure a sufficient temperature level of the transported effluent over a very long length of pipe. In practice, each heating station may comprise a number of horizontal pipe windings which is a multiple of the number of phases of the electrical supply current, the pipe windings each being of a section of pipe around which a solenoid is wound, the solenoids being electrically mounted so as to obtain a multiphase arrangement. This type of architecture is therefore very easy to install and flexible to use.

The design of the local heating station must allow the injection of very high levels of thermal power while minimizing the length of pipe to be heated and respecting a maximum pipe temperature (typically of the order of 150° C.). However, although efficient, the heating station solution presented in publication WO 2016/066968 requires very long pipe lengths to be heated, which considerably increases the weight and dimensions of the heating station.

SUMMARY

The main subject matter of the present invention is therefore to propose a heating installation which does not present the above-mentioned disadvantages.

In accordance with the invention, this is achieved by means of a subsea installation for heating a two-phase liquid/gas effluent circulating within a subsea casing, comprising a plurality of heated pipe sections which are successively connected to one another by curved pipe sections to form a heating coil, each heated pipe section being inclined with respect to the horizontal at an angle comprised between 2 and 10° in order to promote a distributed flow regime of the two-phase effluent and being provided with an induction heating system.

The heating system according to the invention is remarkable in that the heated pipe sections are inclined in relation to the horizontal. As used here, "horizontal" means any direction perpendicular to the direction of gravity. This inclination makes it possible to promote a distributed flow regime of the two-phase effluent circulating in the installation. A "distributed" flow (and in particular a plugged flow) is characterized by a structure with a succession of gas pockets and liquid plugs containing small bubbles. This type of flow contrasts with a "stratified" flow which is obtained by a two-phase effluent flow circulating in horizontal pipe sections and whose liquid/gas interface is in the form of a continuous surface separating the two phases (the liquid is located below the gas under the effect of gravity). A distributed flow regime has been found to increase the heat exchange coefficient between the pipe section and the two-phase effluent (particularly compared with stratified flow, which is inhomogeneous and detrimental to the heat exchange coefficient). The inclination of the heated pipe sections thus makes it possible to obtain a distributed flow regime and to significantly improve the heat exchange coefficient and thus promote the transfer of very high thermal power. In this way, for the same levels of injected power, it is possible to drastically reduce the length of the heated pipe sections, thus reducing the size and weight of the heating system.

It should be noted that promoting a distributed flow regime within the subsea casing goes completely against the prejudices of the skilled person who, on the contrary, tends to promote stratified flow regimes. Indeed, distributed flow regimes have the disadvantage of generating (at least for a range of flow rates) liquid plugs inside the pipe sections which stress the pipe with vibrations, particularly at the connection parts and moreover generate higher pressure drops.

The heating coil can be mounted on a frame formed by an assembly of vertical and horizontal tubes, each section of heated pipe being inclined with respect to the horizontal tubes of the frame at an angle comprised between 2 and 10°.

The heating coil may comprise at least six straight pipe sections connected to each other by at least five curved pipe sections, an inlet for connection to the subsea casing and an outlet, the inlet and outlet preferably being vertically offset from each other.

The heated pipe sections are preferably substantially straight. Preferably also, each heated pipe section of the heating coil is inclined to the horizontal at an angle of 5°.

The heated pipe sections of the heating coil can each be ascending for the effluent, and the curved pipe sections are each descending for the effluent.

Preferably still, at least one of the curved pipe sections is equipped with an induction heating system (although the flow in these curved pipe sections may be less distributed than in heated pipe sections).

The heating system of each heated pipe section of the heating coil may comprise at least one induction coil disposed around the heated pipe section over at least a portion of its length and powered by an electric current so as to generate an induced current in the heated pipe section capable of causing heating thereof.

The induction coils of the heating system can have an electrical power comprised between 1 and 100 kW per meter of wound pipe.

The heated pipe sections can advantageously be covered with a layer of thermal insulation around which the induction coils are wound.

DETAILED DESCRIPTION OF VARIOUS EMBODIMENTS

The invention applies to any single or multiple cased subsea pipe network providing a link between at least one subsea hydrocarbon production well and a surface installation.

The purpose of such a subsea pipe system is to transport hydrocarbon effluents (a two-phase mixture of oil and gas) from one or more subsea production wells to a surface installation, such as a floating production storage and off-loading (FPSO) unit.

These networks generally consist of several single- or multiple-casing subsea pipes laid on the seabed and through which two-phase effluent from production wells circulates.

Figure 1:
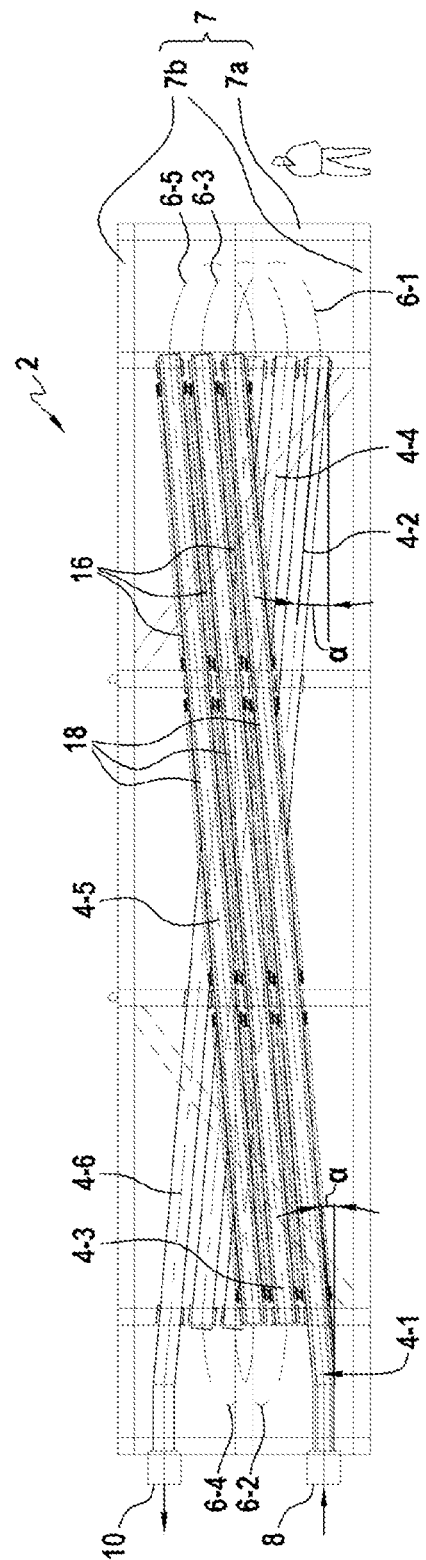
FIG. 1 is a schematic side view of a subsea heating installation according to an embodiment of the invention.
Figure 2:
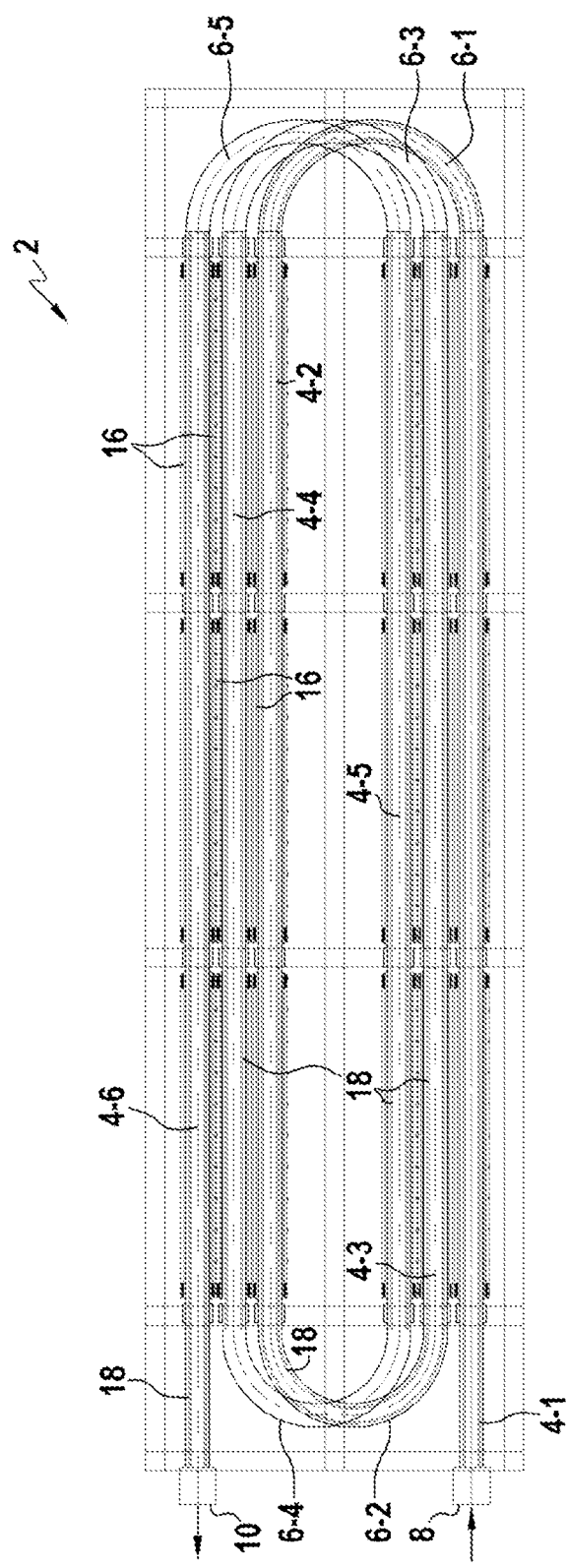
FIG. 2 is a top view of the installation of FIG. 1.

In order to maintain the effluents transported in these subsea pipes at a temperature above a critical threshold making it possible to avoid the formation of deposits inside said pipes, the invention provides for connecting the pipes to one or more removable subsea heating installations such as the one shown in FIGS. 1 and 2.

The heating system 2 shown in these figures is detachably connected to a single casing subsea pipe (not shown). It is controlled from the surface installation (not shown in the figure), depending in particular on the operating mode of the network (typically: normal operation phase, preservation phase or production restart phase).

In general, the heating installation 2 according to the invention comprises a plurality of heated pipe sections 4 which are successively connected to each other by curved pipe sections 6 so as to form a single heating coil, the heated pipe sections 4 being typically made of a conductive metal such as steel. The pipe sections 4, 6 forming the heating coil are mounted on a frame 7 formed by an assembly of vertical tubes 7a and horizontal tubes 7b.

More precisely, in the example embodiment of FIGS. 1 and 2, the heating installation 2 includes an inlet 8 which is intended to be connected to the single casing subsea pipe and which opens into a first section of heated pipe 4-1.

The latter opens (at the end opposite to inlet 8) into a first curved pipe section 6-1 which itself opens at one end of a second heated pipe section 4-2 running in the opposite direction to the first.

The circuit is repeated according to the same scheme so as to form a heating coil comprising here six heated pipe sections 4-1 to 4-6 which are connected to each other by five curved pipe sections 6-1 to 6-5, an inlet 8 and an outlet 10, the inlet and outlet being vertically and horizontally offset from each other.

It should be noted that in this embodiment, the heated pipe sections 4-1 to 4-6 are straight. Of course, they could be curved.

Still according to the invention, the heated pipe sections 4-1 to 4-6 are each inclined with respect to the horizontal (or with respect to the horizontal tubes 7b of the frame 7) by the same angle $\alpha$ which is comprised between 2 and 10°, and which is preferably equal to 5°.

Preferably, the heated pipe sections 4-1 to 4-6 are each ascending in the direction of effluent flow, and curved pipe sections 6-1 to 6-5 are each descending in the direction of effluent flow.

Thus, disposed as such, as shown in FIG. 2, the heated pipe sections 4-1, 4-3 and 4-5 are parallel to each other, as are the heated pipe sections 4-2, 4-4 and 4-6.

The inclination of the heated pipe sections makes it possible to promote a "distributed" flow regime, and more specifically a plug flow, of the two-phase effluent circulating in the installation.

A distributed flow has a structure that has a succession of gas pockets and liquid plugs containing small bubbles. This type of flow contrasts with a "stratified" flow which is obtained by a two-phase effluent flow circulating in horizontal pipe sections and whose liquid/gas interface is in the form of a continuous surface separating the two phases (the liquid is located below the gas under the effect of gravity).

Still according to the invention, at least the heated pipe sections 4-1 to 4-6 are each provided with an induction heating system.

Typically, the heating system for each heated pipe section comprises at least one induction coil 16 (or solenoid) which is disposed around the heated pipe section 4-1 to 4-6 over at least a portion of its length.

These induction coils 16 are supplied with three-phase electric current from the surface installation. As the heated pipe sections are made of steel, the power supply to the induction coils generates an induced current in the coils, which causes them to heat up. The heat is then transferred via the heated pipe sections to the circulating two-phase fluid by convection.

By way of example, to raise the outside temperature of the heated pipe sections, the induction coils of the heating system have an electrical power comprised between 1 and 100 kW per meter of wound pipe.

It will be noted that the heated pipe sections 4-1 to 4-6, as well as curved pipe sections 6-1 to 6-5, can be covered with a layer of thermal insulation 18. In this case, the induction coils 16 are wrapped around this layer of thermal insulation.

Such an arrangement of the subsea heating installation with heated pipe sections inclined to the horizontal significantly improves the heat transfer between the inner side of the heated pipe sections and the circulating two-phase effluent.

By way of example, compared with a horizontal subsea heating system (as described in WO 2016/066968), it is possible to shorten the length of the heated pipe sections by more than 40% for the same electrical power.

It will be noted that in the embodiment of FIGS. 1 and 2, only the heated pipe sections 4-1 to 4-6 are equipped with induction heating. Of course, the curved pipe sections could also be heated.

Figure 3:
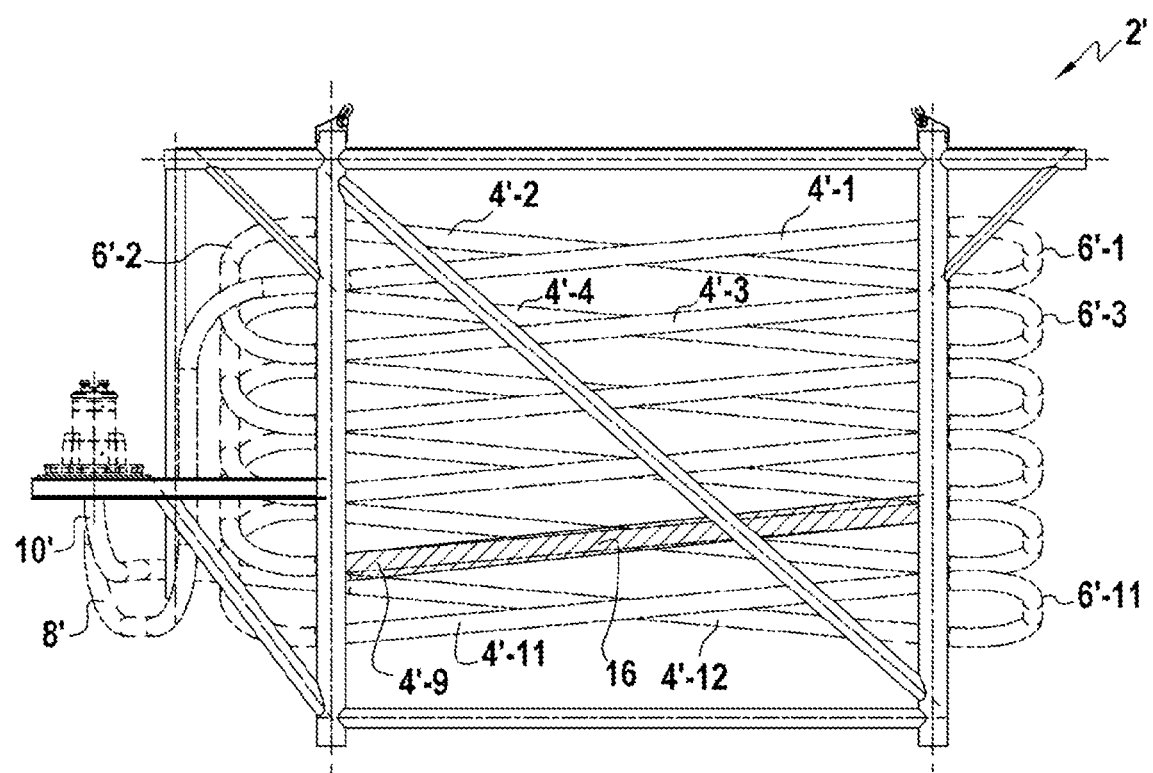
FIG. 3 is a schematic side view of a subsea heating installation according to another embodiment of the invention.

In connection with FIG. 3, a subsea heating installation 2' will now be described according to another embodiment of the invention.

This embodiment differs from the one described above in particular by its heating coil architecture, which comprises twelve straight heated pipe sections 4'-1 to 4'-12 which are successively connected to each other by eleven curved pipe sections 6'-1 to 6'-11. The heated pipe sections 4'-1 to 4'-12 are each provided with an induction heating system (in FIG. 3, for reasons of convenience, only the pipe section 4'-9 is shown with an induction coil 16).

Furthermore, still in this embodiment, the input 8' and the output 10' are vertically aligned and horizontally offset from each other.

The invention claimed is:

1. A subsea installation for heating a two-phase liquid/gas effluent circulating inside a subsea casing, comprising:
   a plurality of heated pipe sections which are connected successively to one another by curved pipe sections to form a heating coil, each heated pipe section being inclined with respect to the horizontal at an angle comprised between 2 and 10° to promote a distributed flow regime of the two-phase effluent and being provided with an induction heating system;
   wherein the distributed flow regime of the two-phase effluent comprises a succession of gas pockets and liquid plugs;
   wherein the subsea installation provides a link for transporting the two-phase effluent between a subsea hydrocarbon production well and a surface installation;
   wherein the heated pipe sections of the heating coil are each ascending for the effluent, and the curved pipe sections are each descending for the effluent.

2. The installation as claimed in claim 1, wherein the heating coil is mounted on a frame formed by an assembly of vertical and horizontal tubes, each section of heated pipe being inclined relative to the horizontal tubes of the frame by an angle comprised between 2 and 10°.

3. The installation as claimed in claim 1, wherein the heating coil comprises an inlet for connection to the subsea casing and opening into a heated pipe section which is ascending for the effluent flowing therein.

4. The installation as claimed in claim 1, wherein the heated pipe sections are substantially straight.

5. The installation as claimed in claim 1, wherein the heating coil comprises at least six straight pipe sections connected to each other by at least five curved pipe sections, an inlet for connection to the subsea casing and an outlet, the inlet and the outlet being vertically offset from each other.

6. The installation as claimed in claim 1, wherein each heated pipe section of the heating coil is inclined with respect to the horizontal at an angle of 5°.

7. The installation as claimed in claim 1, wherein at least one of the curved pipe sections is provided with an induction heating system.

8. The installation as claimed in claim 1, wherein the heating system of each heated pipe section of the heating coil comprises at least one induction coil disposed around the heated pipe section over at least a portion of its length and powered by an electric current so as to generate an induced current in the heated pipe section capable of causing heating thereof.

9. The installation as claimed in claim 8, wherein the induction coils of the heating system have an electrical power comprised between 1 and 100 kW per meter of wound pipe.

10. The installation as claimed in claim 8, wherein the heated pipe sections are covered with a layer of thermal insulation around which the induction coils are wound.

11. A subsea installation for heating a two-phase liquid/gas effluent circulating inside a subsea casing, comprising a plurality of heated pipe sections which are connected successively to one another by curved pipe sections to form a heating coil, each heated pipe section being inclined with respect to the horizontal at an angle comprised between 2 and 10° to promote a distributed flow regime of the two-phase effluent and being provided with an induction heating system;
   wherein the distributed flow regime of the two-phase effluent comprises a succession of gas pockets and liquid plugs;
   wherein the distributed flow regime of the two-phase effluent induces vibrations and generates higher pressure drops at the curved pipe sections; and
   wherein the subsea installation provides a link for transporting the two-phase effluent between a subsea hydrocarbon production well and a surface installation;
   wherein the heated pipe sections of the heating coil are each ascending for the effluent, and the curved pipe sections are each descending for the effluent.

* * * * *